United States Patent [19]

LaNois et al.

[11] Patent Number: 5,525,200
[45] Date of Patent: Jun. 11, 1996

[54] LOW TEMPERATURE VACUUM DISTILLATION APPARATUS

[76] Inventors: Rene LaNois; Gerald Gajnos; Richard Dent, all of 43 Sylvan St., P.O. Box 1061, West Springfield, Mass. 01090

[21] Appl. No.: 913,811

[22] Filed: Jul. 16, 1992

[51] Int. Cl.$^6$ ..................................... B01D 3/10
[52] U.S. Cl. .......................... 202/205; 202/182; 202/189; 202/202; 203/91
[58] Field of Search ..................................... 202/182, 205, 202/185.1, 189, 202; 203/91; 159/DIG. 16, DIG. 40, 901; 137/409; 62/238.5

[56] References Cited

U.S. PATENT DOCUMENTS

| | | | |
|---|---|---|---|
| 3,096,257 | 7/1963 | Foutz | 202/205 |
| 3,219,555 | 11/1965 | Poindexter et al. | 202/205 |
| 3,302,373 | 2/1967 | Williamson | 202/205 |
| 3,471,373 | 10/1969 | Pottharst, Jr. | 202/202 |
| 3,607,661 | 9/1971 | Cerny et al. | 202/158 |
| 3,723,395 | 3/1973 | Warzell | 159/43.2 |
| 3,990,951 | 11/1976 | Rajakovics | 202/203 |
| 4,026,200 | 5/1977 | Lindquist | 202/263 |
| 4,366,031 | 12/1982 | Anderson | 202/205 |
| 4,555,307 | 11/1985 | Hagen | 202/205 |
| 4,561,940 | 12/1985 | Meier | 202/202 |
| 4,591,413 | 5/1986 | Peterson | 202/202 |

*Primary Examiner*—Virginia Manoharan

[57] ABSTRACT

Apparatus for purifying any type of contaminated liquid. The apparatus includes a series of closed but connected passageways in an S configuration of equal diameter open to each other such that the process is effectuated in one cylindrical device as opposed to several closed chambers. Contaminated liquid is introduced into the apparatus, boiled and evaporated at a low temperature due to a low pressure created by a vacuum pump; the vapor produced proceeds in an upwardly direction through an S configuration of baffleless pathways which is tortuous. Liquid particulates are separated from vapor by the configuration of the apparatus and contained within the contaminated liquid. Pure vapor proceeds through the apparatus and is converted to pure liquid and recovered.

2 Claims, 3 Drawing Sheets

LOW TEMPERATURE VACUUM DISTILLATION APPARATUS

BACKGROUND OF THE INVENTION

1. Field of the Invention

The invention relates generally to apparatus used in a vacuum distillation process for purifying any type of contaminated liquid.

2. Invention Disclosure Statement

Generally in the prior art vacuum distillation apparatus consisted of cylindrical shaped devices of varying sizes and dimensions using in most cases a heating chamber and a vacuum pump and baffles to collect condensate. The prior art reveals apparatus of very limited effect in purifying any type of contaminated liquid in terms of energy efficiency. The object of the invention is to respond to the need for apparatus which efficiently accomplishes distillation and purification in a unique configuration which enhances energy efficiency.

BRIEF SUMMARY OF THE INVENTION

It is the aim of the present invention to address the need for apparatus for a vacuum distillation process to purify any type of contaminated liquid.

It is the further aim of the present invention to provide apparatus which is energy efficient and very effective due to the arrangement of the components of the apparatus in relationship to each other.

Briefly stated, in the present invention a vacuum distillation apparatus is disclosed for purifying any type of contaminated liquid. The present invention teaches apparatus which comprises a series of closed but connected passageways of equal diameter open to each other such that the apparatus is effectuated in one cylindrical device as opposed to several closed chambers. The apparatus is arranged in an S configuration. Contaminated liquid is introduced into the apparatus and boiled and evaporated at a low temperature due to a low pressure created by a vacuum pump; the vapor produced as a result of the boiling liquid proceeds in an upwardly direction through a baffleless pathway which is tortious due to its unique configuration. Liquid particulates are separated from vapor by the tortious configuration of the pathway. Pure vapor proceeds through the apparatus and is converted to pure liquid and recovered. The apparatus includes separation and product chambers and a refrigeration unit to help evaporate the contaminated liquid and condense the vapor to pure liquid. The present apparatus consists of horizontal and vertical chambers arranged in a unique configuration, maintained under a low pressure by a mechanical vacuum pump.

Unlike the prior art, this apparatus consists of a unique configuration which eliminates the need for baffles or demisters through the separation of liquid and vapor. This allows for the free flow of vapor throughout the vessel thus increasing its capacity. This apparatus incorporates a unique float control bypass valve for the delivery of the distillate under pressure to a remote location, thereby eliminating the need for a distillate transfer pump. The features of this invention all add to increase the efficiency of the distillation apparatus thus reducing the cost per gallon of purified liquid over that of the prior art.

DETAILED DESCRIPTION OF THE PREFERRED EMBODIMENT

Figure 1:
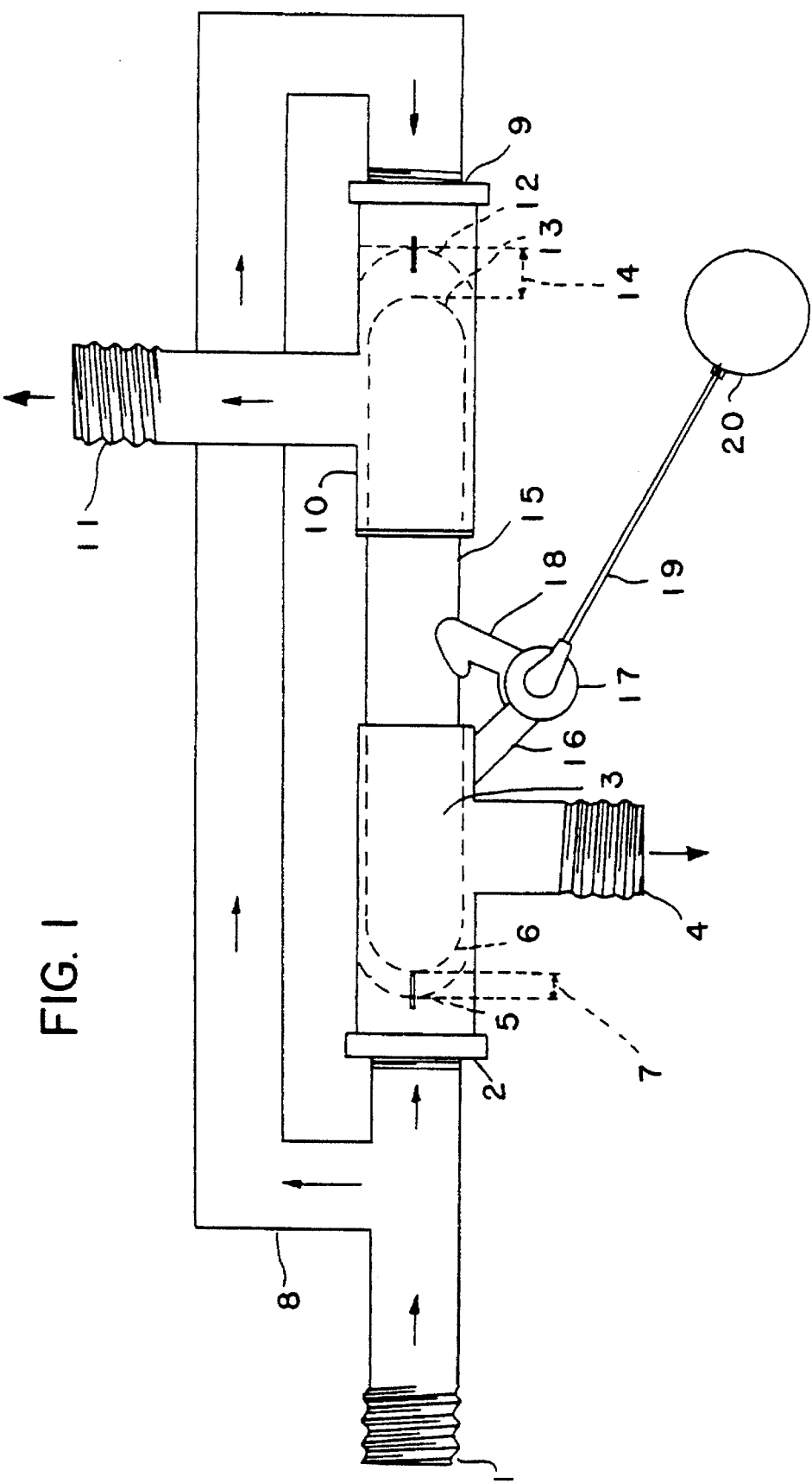
FIG. 1 is a view of the float control bypass valve
Figure 2:
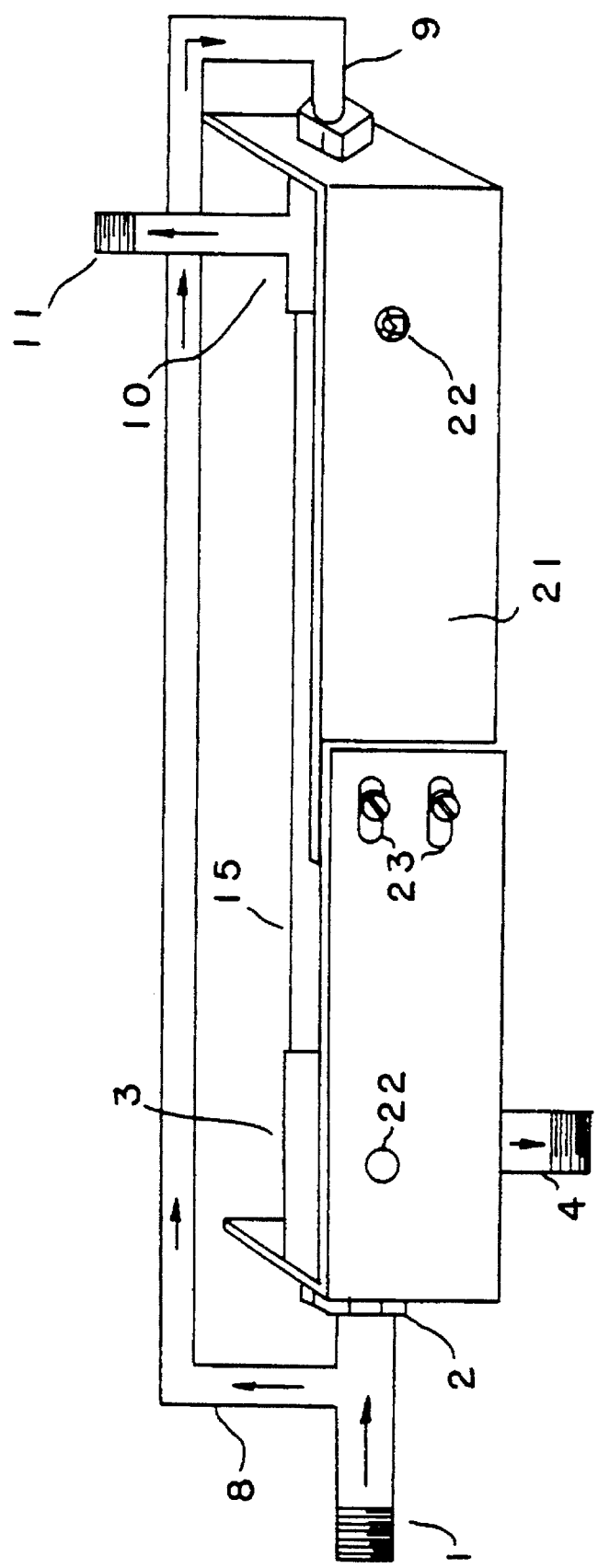
FIG. 2 is a view of the mounting and alignment bracket which holds the apparatus

Referring to FIGS. 1 and 2, the circulating liquid enters bypass valve assembly 38 through inlet 1 pressurizing return valve inlet 2 and diverting liquid bypass tube 8. The liquid in bypass tube 8 enters bypass inlet 9 and is stopped by bypass valve seat 12. The recirculated liquid is passed through return valve seat 5 and return valve seal 6 along for complete passage through return valve outlet 4. As the liquid level 33 in tank 32 rises due to the collection of pure condensed vapor, float 20, which is attached by float rod 19 to float pivot 17, pivots on float bracket 16. The piston control arm 18 moves thereby moving the common piston valve stem 15 to shorten the distance 7 between the return valve seat 5 and return valve seal 6. At the same time, the common piston valve stem 15 increases the space 14 between the bypass valve seat 12 and bypass valve seal 13 thereby allowing diverted liquid to exit the bypass valve assembly 38 via bypass valve outlet 11. The mounting in alignment bracket 21 has alignment and adjusting screws 23 which hold the valves 3 and 10 in proper horizontal alignment and separation. Valve assembly 38 is held in place by mounting bracket hold 22.

Figure 3:
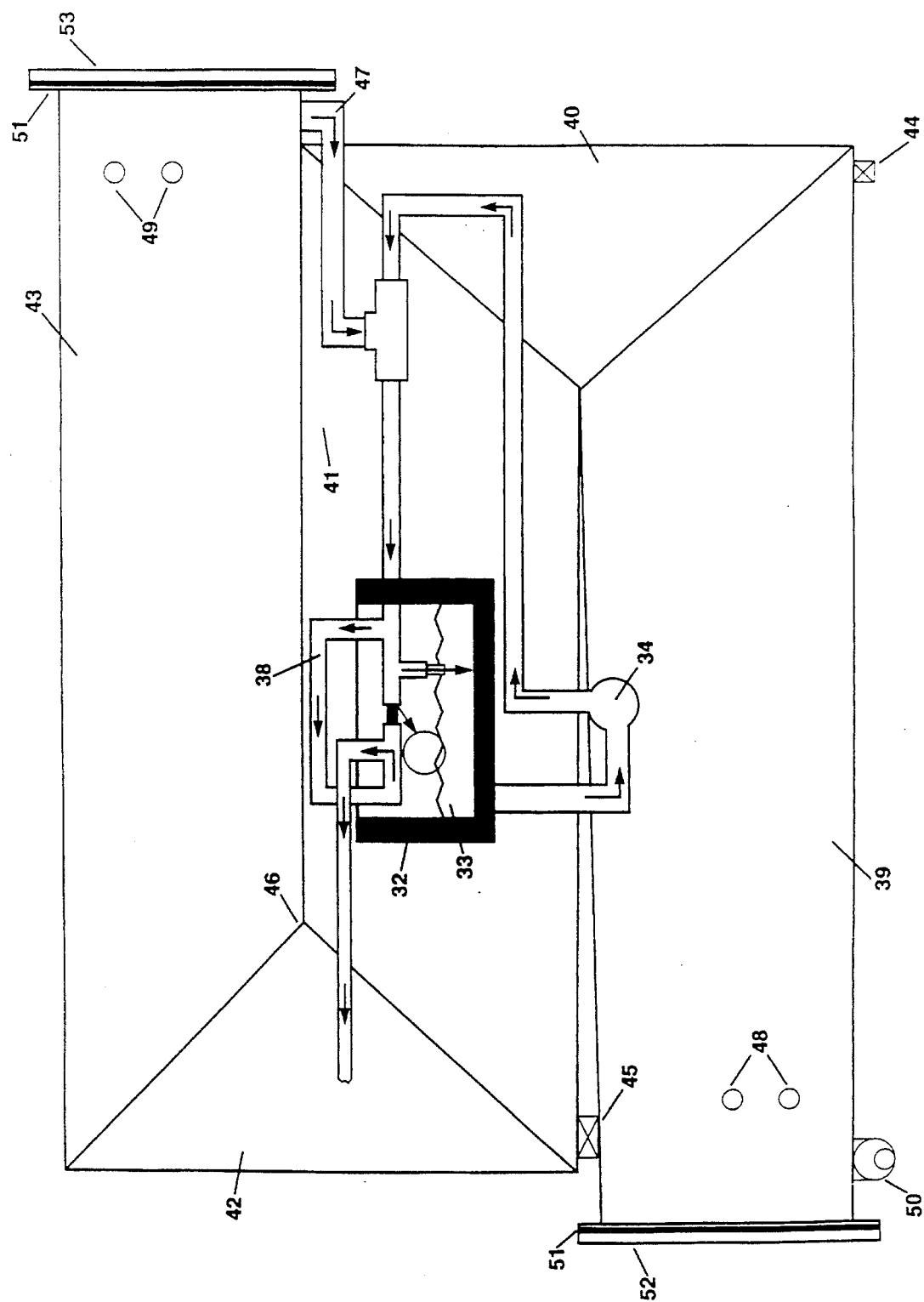
FIG. 3 is a view of the S configuration of the apparatus

FIG. 3 shows the S shaped configuration of the apparatus. The contaminated liquid enters boiling chamber 39 to boil at a reduced pressure which is maintained by mechanical pump 34 circulating water from tank 32 through jet pump 35 and back to tank 32 through float control bypass valve 38. Heat from a refrigeration unit, is introduced to the boiling chamber 39 by a heat exchanger through its inlet and outlet 48. Vapor produced by the boiling liquid travels a tortuous path by passing through the first vertical riser 40, then the horizontal passage 41, into the second vertical riser 42, and finally into the condensing chamber 43 to condense on a cold heat exchanger which has its inlet and outlet 49. Any liquid escaping the boiling chamber 39 will drop out as it travels through the horizontal passage 41 and fall back to the boiling chamber 39. A second vertical riser 42 is a further obstacle to any carryover from the boiling chamber 39 reaching condensing chamber 43. The one inch spacer 44 facilitates emptying of the boiling chamber 39 through outlet drain 50 while the two inch spacer 45 allows drainage of carryover liquid back to the boiling chamber 39. This two inch spacer also gives pitch to the condensing chamber toward the drain 47 which in conjunction with internal dam 46 prevents the pure condensed vapor from draining back to the boiling chamber forcing it to be pulled through drain 47 into the recirculating water for the jet pump 35 and left to be dispersed through diverting valve 38.

What is claimed is:

1. A vacuum distillation apparatus comprising three cylindrical chambers configured in an S-shape containing no baffles and conveying distilled liquid via a mechanical by-pass valve system;

said cylindrical chambers stacked and connected such that a middle chamber is connected at one end to a lower horizontal boiling chamber and at its other end to an upper condensing and collecting chamber by means of vertical risers or spacers attached to the bottom surface of the lower boiling chamber at the connected end and between the lower and middle chamber at the opposite end, a dam attached to the lower surface of the upper condensing chamber at the connected end, a drain positioned on the lower surface of the upper condensing and collecting chamber at the unconnected end wherein contaminated liquid is boiled in the lower horizontal boiling chamber at a reduced pressure maintained by a mechanical vacuum pump, resultant vapor travels upwardly and horizontally through the S configuration such that the vapor which reaches the upper condensing and collecting chamber is condensed and collected by means of the dam which prevents the liquid from returning to the lower boiling chamber and wherein condensed liquid is pitched toward the drain at the end of the collecting chamber opposite the dam.

2. The vacuum distillation apparatus as in claim 1 wherein the condensed liquid which passes through the drain is conveyed to the mechanical by-pass valve system said bypass valve system comprising an inlet pipe, a return valve outlet, and a bypass valve outlet, said return valve outlet being located on the lower surface and near one end of a piston assembly and said bypass valve outlet being positioned on the upper surface near the opposite end of said piston assembly, said piston assembly being attached to a piston control arm and a float bracket which are in turn attached to a float pivot connected by a float which rises and falls according to the level of liquid in a collection tank connected by tubing to the drain in the upper chamber such that the position of the float moves the piston between a bypass valve seat and a return valve seat and such that the position of the piston causes liquid to exit the bypass valve system through either the return valve outlet or the bypass valve outlet.

* * * * *